US009275103B2

(12) United States Patent
Chikkam et al.

(10) Patent No.: US 9,275,103 B2
(45) Date of Patent: Mar. 1, 2016

(54) OPTIMIZATION OF JOIN QUERIES FOR RELATED DATA

(71) Applicant: International Business Machines Corporation, Armonk, NY (US)

(72) Inventors: Venkata Satya Gopal Chikkam, Hyderabad (IN); Chandrashekhar K. Jain, Pune (IN); Vikas Pandey, Gwalior (IN)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 13/779,811

(22) Filed: Feb. 28, 2013

(65) Prior Publication Data
US 2014/0244681 A1    Aug. 28, 2014

(51) Int. Cl.
*G06F 17/30* (2006.01)
(52) U.S. Cl.
CPC .... *G06F 17/30424* (2013.01); *G06F 17/30442* (2013.01)
(58) Field of Classification Search
None
See application file for complete search history.

(56) References Cited

U.S. PATENT DOCUMENTS

| 5,091,852 | A | 2/1992 | Tsuchida et al. |
|---|---|---|---|
| 5,548,755 | A | 8/1996 | Leung et al. |
| 5,548,758 | A | 8/1996 | Pirahesh et al. |
| 5,713,015 | A | 1/1998 | Goel et al. |
| 5,724,568 | A | 3/1998 | Bhargava et al. |
| 5,864,842 | A | 1/1999 | Pederson et al. |
| 5,960,427 | A | 9/1999 | Goel et al. |
| 5,987,453 | A | * 11/1999 | Krishna et al. |
| 6,032,144 | A | 2/2000 | Srivastava et al. |
| 6,086,893 | A | 7/2000 | Dupuy et al. |
| 6,243,710 | B1 | 6/2001 | DeMichiel et al. |
| 6,438,542 | B1 | 8/2002 | Koo et al. |
| 6,571,233 | B2 | 5/2003 | Beavin et al. |

(Continued)

OTHER PUBLICATIONS

Jakobsson et al.; "Query Optimization in Oracle Database 10g Release 2."; An Oracle White Paper; Jun. 2005; Oracle Corporation; California.

(Continued)

*Primary Examiner* — Robert Beausoliel, Jr.
*Assistant Examiner* — Pedro J Santos
(74) *Attorney, Agent, or Firm* — Daniel R. Simek

(57) ABSTRACT

Embodiments of the present invention disclose a method, computer program product, and system for optimizing execution of a query that includes a JOIN against a system utilizing data relationship concepts. A computer determines whether one or more data structures in JOIN include a parent/child relationship. The one or more data structures can be one or more tables. Responsive to determining that the one or more data structures in JOIN include a parent/child relationship, the computer determines whether the query that includes the JOIN includes a filter applied on one or more data structures in the JOIN with an OR condition between filters. Responsive to determining that the query that includes the JOIN does not include the filter applied on one or more data structures in JOIN with an OR condition between filters, the computer modifies the query that includes the JOIN into a query utilizing relationship constructs.

20 Claims, 6 Drawing Sheets

(56) References Cited

U.S. PATENT DOCUMENTS

| | | |
|---|---|---|
| 6,757,677 B2 | 6/2004 | Pham et al. |
| 7,539,660 B2 | 5/2009 | Focazio et al. |
| 7,546,311 B2 | 6/2009 | Nica |
| 7,702,616 B1 * | 4/2010 | Li et al. .................. 707/999.002 |
| 7,734,608 B2 | 6/2010 | Fell et al. |
| 7,904,487 B2 * | 3/2011 | Ghatare ........................ 707/803 |
| 8,065,264 B1 | 11/2011 | Achanta |
| 2010/0293161 A1 | 11/2010 | Poppe et al. |
| 2011/0295836 A1 | 12/2011 | Bolsius et al. |
| 2012/0047158 A1 | 2/2012 | Lee et al. |
| 2012/0173517 A1 * | 7/2012 | Lang et al. .................... 707/722 |
| 2013/0282740 A1 * | 10/2013 | Zhou et al. .................... 707/756 |

OTHER PUBLICATIONS

Nevarez, "The SQL Server Query Optimizer." <http://www.simple-talk.com/sql/sql-training/the-sql-server-query-optimizer/>; Aug. 3, 2011.

Trongratsameethong et al.; "ESU-GOO: The join order algorithm for optimizing small join queries." Scientific Research and Essays vol. 7(5), pp. 560-572, Feb. 9, 2012; <http://www.academicjournals.org/SRE>: DOI: 10.5897/SRE11.491; ISSN1992-2248 Copyright 2012 Academic Journals.

U.S. Appl. No. 14/467,492, entitled "Optimization of JOIN Queries for Related Data", filed Aug. 25, 2014.

* cited by examiner

EXAMPLE QUERY
4A

```
SELECT    Parent.ID, Child.Name
  FROM    Parent INNER JOIN Child
    ON    Parent.ID = Child.ParentID
```

FIG. 4A

EXAMPLE QUERY
4B

```
SELECT    Parent.ID, Child.Name
  FROM    Parent LEFT OUTER JOIN Child
    ON    Parent.ID = Child.ParentID
 WHERE    Parent.Type = 'IT' OR Child.ID = 'ODRS17XYZ777'
```

FIG. 4B

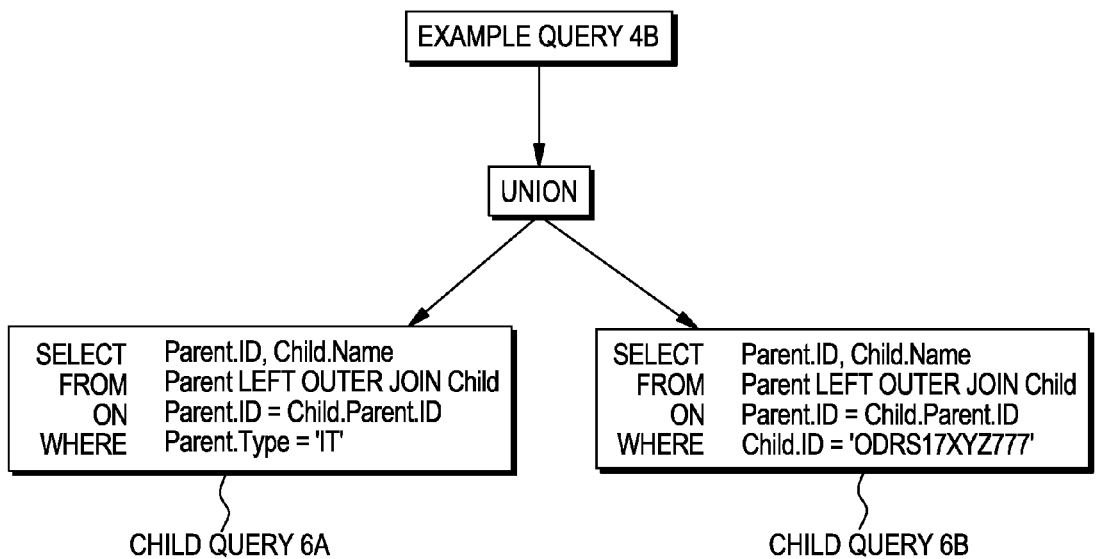

OPTIMIZATION OF JOIN QUERIES FOR RELATED DATA

FIELD OF THE INVENTION

The present invention relates generally to the field of query processing, and more particularly to processing queries against systems that supports data relationships and process relationship queries.

BACKGROUND OF THE INVENTION

Queries can be used to view, add or remove data in a system. A query is sent from a server to a system, where the system produces a necessary result responsive to the query, and returns the desired result back to the server. Queries can be used for retrieving data from one or more objects. In an example, queries are carried out in Structured Query Language (SQL). SQL queries for retrieving data from one or more data structures are initiated with a SELECT statement, which then can include multiple keywords and clauses (i.e. FROM, WHERE, ON). In a FROM clause, a JOIN sub-clause can be used to specify rules for combining records from two or more data structures (i.e. tables) to create a set of data or another data structure. There are different types of JOIN queries (i.e. INNER, OUTER, RIGHT and LEFT) that specify how the data structures are combined.

Systems can contain sets of data that share relationships with other sets of data. Related data can be queried through relationship queries, which allow multiple entities to be queried in a single request. A type of data relationship is the parent/child relationship, where one or more child entities correspond to a specific parent entity.

SUMMARY

Embodiments of the present invention disclose a method, computer program product, and system for optimizing execution of a query that includes a JOIN against a system utilizing data relationship concepts. A computer determines whether one or more data structures in JOIN include a parent/child relationship. The one or more data structures can be one or more tables. Responsive to determining that the one or more data structures in JOIN include a parent/child relationship, the computer determines whether the query that includes the JOIN includes a filter applied on one or more data structures in the JOIN with an OR condition between filters. Responsive to determining that the query that includes the JOIN does not include the filter applied on one or more data structures in JOIN with an OR condition between filters, the computer modifies the query that includes the JOIN into a query utilizing relationship constructs. In another embodiment, if the query does include a filter applied on one or more data structures in JOIN with an OR condition between filters, the computer determines child queries from the query that utilize relationship constructs. When the result set of the child queries is returned, the computer performs a UNION of the returned result set for the child queries.

BRIEF DESCRIPTION OF THE SEVERAL VIEWS OF THE DRAWINGS

FIGS. 4A and B depict exemplary queries in accordance with exemplary embodiments of the present invention.

FIG. 5 is a depiction of an exemplary query modified by JOIN query modification program in accordance with exemplary embodiments of the present invention.

FIG. 6 is a depiction of an exemplary query decomposed into child queries by multiple filter modification program in accordance with exemplary embodiments of the present invention.

DETAILED DESCRIPTION

Figure 1:
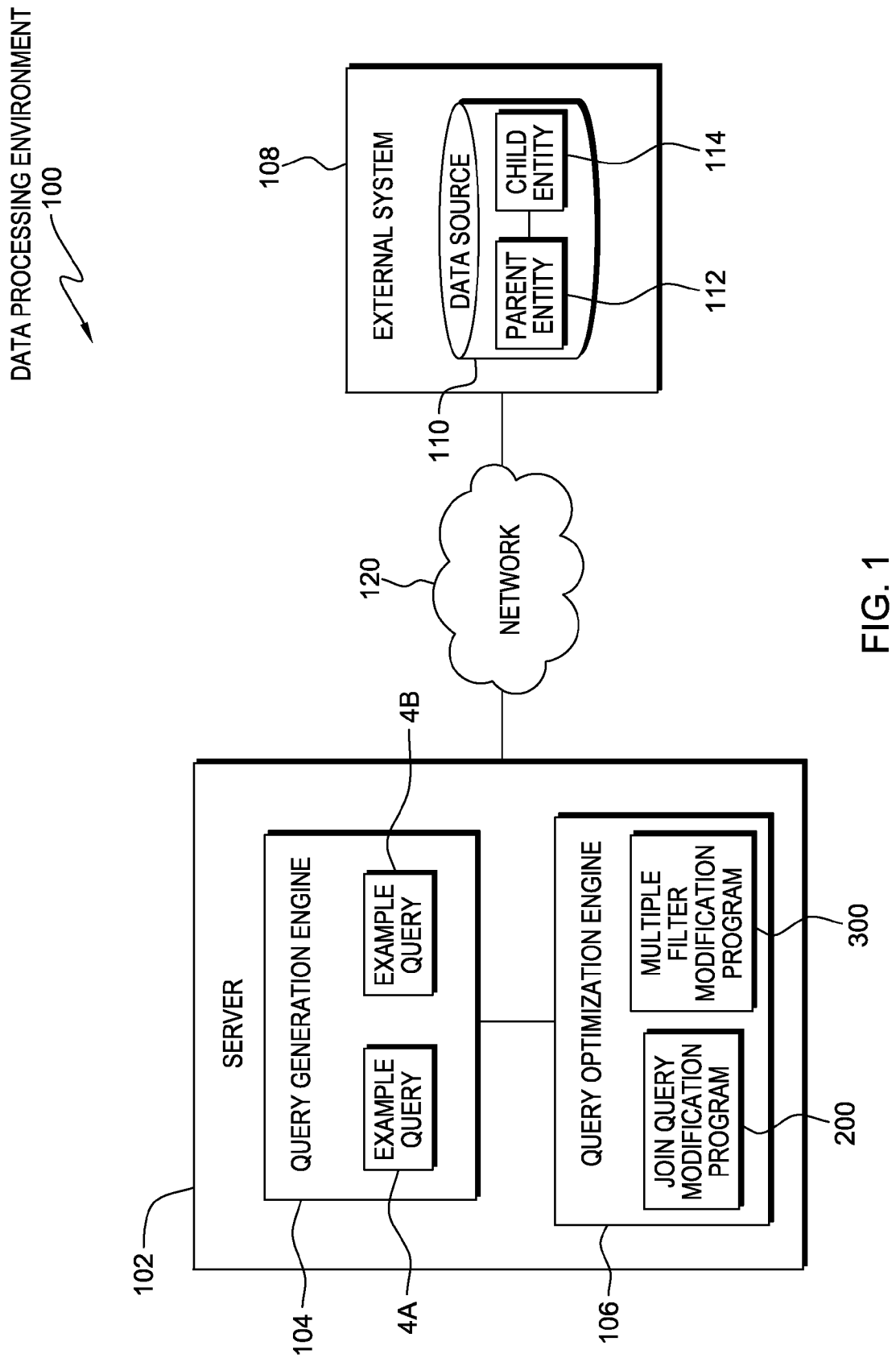
FIG. 1 is a functional block diagram of a data processing environment in accordance with an embodiment of the present invention.

Embodiments of the present invention recognize that when a server generates a JOIN-based query, a large number of individual queries may need to be executed against a system separately, and then the server will have to JOIN all result sets locally. In such an approach, a single complex query that is broken down into multiple queries can compound network latency. Performing local processing to JOIN result sets of multiple queries can lead to utilization of extra resources on the server. Embodiments of the present invention can reduce network latency, and execution time as well as local processing overhead.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a data processing environment 100, in accordance with one embodiment of the present invention.

Data processing environment 100 includes server 102, external system 108, and network 120. In one embodiment, server 102 and external system 108 can be desktop computers, specialized computer servers, or any other computer systems known in the art. In certain embodiments, server 102 and external system 108 represent computer systems utilizing clustered computers and components (e.g., database server computers, application server computers, etc.) that act as a single pool of seamless resources when accessed by elements of data processing environment 100. In general, server 102 and external system 108 are representative of any electronic device or combination of electronic devices capable of executing machine-readable program instructions, as described in greater detail with regard to FIG. 7. In some examples, server 102 is a Business Intelligence (BI) server, relational database management systems (RDBMS), or another form of computing systems or server capable of processing queries.

In one embodiment, server 102 includes query generation engine 104 and query optimization engine 106. Query generation engine 104 generates queries that are sent out to external system 108. In exemplary embodiments, user input into query generation engine 104 through server 102 allows for definition of queries. In one embodiment, query generation engine 104 includes example query 4A and example query 4B. Example query 4A and example query 4B are depicted in further detail with regard to FIGS. 4A and 4B. In one embodiment, example query 4A and example query 4B are exemplary queries that query optimization engine 106 processes and sends to external system 108. Query optimization engine 106 processes queries from query generation engine (i.e. example query 4A and example query 4B). Query optimization engine 106 includes JOIN query modification program 200 and multiple filter modification program 300. In one embodiment, query optimization engine 106 utilizes JOIN query modification program 200 and multiple filter modification program 300 to modify queries in accordance with various embodiments of the present invention. In an alternate embodiment, query optimization engine 106 is a remote server or system separate from server 102, where query generation engine 104 accesses query optimization engine 106 prior to sending a query to external system 108. Query generation engine 104 and query optimization engine 106 are discussed in greater detail with regard to FIG. 7. In an exemplary embodiment, example query 4A and example query 4B originate from query generation engine 104, go through processing in query optimization engine 106, and then are sent to external system 108.

In an embodiment, the elements of data processing environment 100 can communicate through network 120. Network 120 can be, for example, a local area network (LAN), a telecommunications network, a wide area network (WAN) such as the Internet, or a combination of the three, and include wired, wireless, or fiber optic connections. In general, network 120 can be any combination of connections and protocols that will support communications between server 102 and external system 108 in accordance with a desired embodiment of the present invention.

In one embodiment, external system 108 includes a data source 110 that includes a parent entity 112 and child entity 114. In another embodiment, external system 108 is any form of server or computer system that supports data relationships and can process relationship queries. In other embodiments, external system 108 can include more than one data source 110. Data source 110 can be implemented with any type of storage device that is capable of storing data for access and utilization by elements of server 102, such as a database server, a hard disk drive, or flash memory. In other embodiments, data source 110 can represent multiple databases within external system 108. Parent entity 112 and child entity 114 represent data within data source 110 that have a parent/child relationship. In one embodiment, data source 110 includes metadata defining relationships of data (i.e. parent entity 112 and child entity 114) within data source 110. In an example, parent entity 112 represents a user account on data source 110 of external system 108, and child entity 114 represents data within data source 110 corresponding to (has a relationship to) the user account represented by parent entity 112 (i.e. contact information). In one embodiment, parent entity 112 and child entity 114 can include, or represent data structures that server 102 can query. In exemplary embodiments, the data structures represent data tables.

Figure 2:
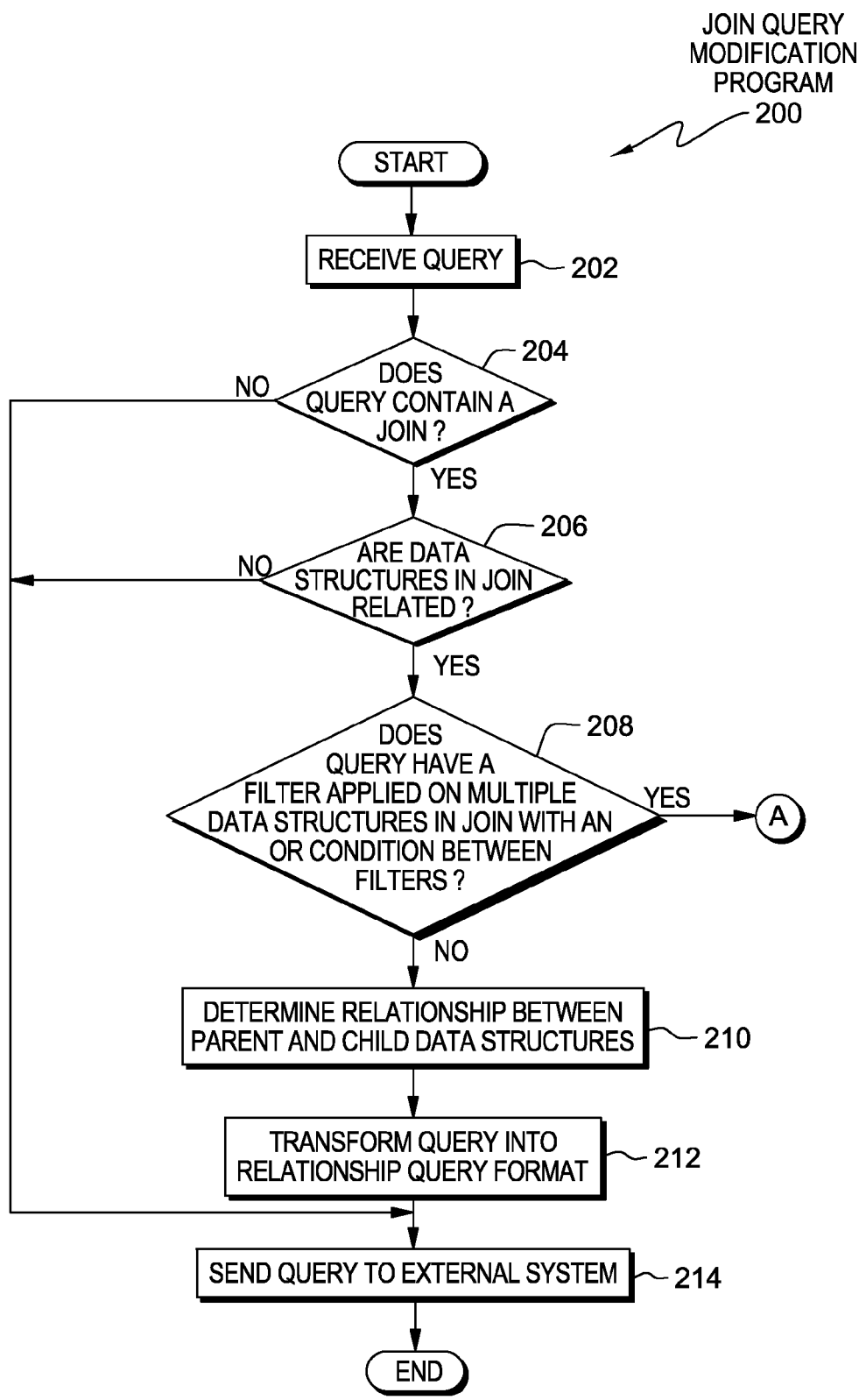
FIG. 2 is a flowchart depicting operational steps of a program for modifying a query containing JOIN, in accordance with an embodiment of the present invention.

FIG. 2 is a flowchart depicting operational steps of JOIN query modification program 200 in accordance with an exemplary embodiment of the present invention.

In step 202, JOIN query modification program 200 receives a query. In one embodiment, JOIN query modification program 200 initiates when query optimization engine 106 receives a query (i.e. example query 4A, example query 4B) from query generation engine 104.

In decision step 204, JOIN query modification program 200 determines whether the query contains a JOIN. In an example with regard to example query 4A or example query 4B, JOIN query modification program 200 determines that example query 4A and example query 4B contain a JOIN (more specifically an INNER JOIN in example query 4A, and LEFT OUTER JOIN in example query 4B) in the FROM clause. In this example, both queries will continue through JOIN query modification program 200. In other exemplary embodiments, JOIN query modification program 200 processes LEFT OUTER JOIN, RIGHT OUTER JOIN, or INNER JOIN queries. If an example where JOIN query modification program 200 determines that a query does not include a JOIN, no further optimization occurs and JOIN query modification program 200 converts the query to a format compatible with external system (discussed in further detail with regard to step 214). In examples, a JOIN query can contain more than two data structures, with one parent data structure and multiple child data structures.

In decision step 206, JOIN query modification program 200 determines whether the data structures in the JOIN are related. In one embodiment, if JOIN query modification program 200 accesses metadata in data source 110 corresponding to the data structures in the JOIN to determine whether a relationship exists, and the details of the relationship (i.e. which data structure is the parent, which data structure is the child). In an example with regards to example query 4A and example query 4B, JOIN query modification program 200 determines that a relationship exists between data structures in the JOIN (depicted as "Parent" and "Child" in FROM clause of example query 4A and example query 4B). Since both example query 4A and example query 4B include data structures in the JOIN that are related, both queries continue through JOIN query modification program 200. If JOIN query modification program 200 determines that the data structures in the JOIN of a query are not related, JOIN query modification program 200 follows traditional methods of splitting the query into individual queries and joining the result sets locally.

In decision step 208, JOIN query modification program 200 determines whether a query has a filter applied on multiple data structures in JOIN with an OR condition between filters. In one embodiment, JOIN query modification program 200 inspects the WHERE clause of a query (if a WHERE clause exists) to determine whether an OR condition exists between filters. In an example with regard to example query 4A, JOIN query modification program 200 determines that example query 4A does not have a filter applied on multiple data structures in JOIN with an OR condition between filters. In this example, example query 4A continues through JOIN query modification program 200. In another example with regard to example query 4B, JOIN query modification program 200 determines that example query 4B does have a filter applied on multiple data structures in JOIN with an OR condition between filters (depicted in the WHERE clause of example query 4B). In this example, JOIN query modification program 200 sends example query to multiple filter modification program 300 (depicted in FIG. 2 as directing a query to "A"). The further processing of example query 4B by multiple filter modification program 300 is discussed in greater detail with regard to FIG. 3.

In step 210, JOIN query modification program 200 determines the relationship between the parent and child data structures. In one embodiment, since in decision step 206 JOIN query modification program 200 determines that a relationship exists, JOIN query modification program 200 accesses metadata on data source 110 to determine the details of the relationship between the data structures. In an alternate embodiment, the details of the relationship (which entity is the parent and the child) are stored in a storage device that JOIN query modification program 200 accesses at the time that JOIN query modification program 200 determines a relationship exists in decision step 206. In an example with regard to example query 4A, "Parent" relates to "Child" through the relationship of "Parent" being the parent data structure of "Child". In this example, with regard to FIG. 1, "Parent" corresponds to parent entity 112, and "Child" corresponds to child entity 114.

In step 212, JOIN query modification program 200 transforms the query into relationship query format. In one embodiment, JOIN query modification program 200 utilizes parent/child relationship constructs to convert a query into relationship query format, which is compatible with external system 108. In an example with regard to the INNER JOIN of example query 4A, JOIN query modification program 200 evaluates each column in the specification of input query with INNER JOIN sequentially, and one at a time. When JOIN query modification program 200 finds a column to from parent entity 112, JOIN query modification program 200 modifies the formatting to reference child entity 114. In this example, to modify formatting to reference child entity 114, JOIN query modification program 200 modifies the SELECT clause of example query 4A to "SELECT Child.Parent.ID, Child.Name", as depicted in modified example query 5A. Modified example query 5A is depicted in further detail with regard to FIG. 5A. In this example, JOIN query modification program 200 alters the FROM clause of example query 4A to the name of the child data structure ("FROM Child"), as depicted in modified example query 5A. Next, in this example, JOIN query modification program 200 adds a filter to example query 4A corresponding to the parent reference of the child data structure, depicted as "WHERE Child.ParentID !=NULL" in modified example query 5A. In one embodiment, since Child.ParentID !=NULL, JOIN query modification program 200 eliminates child data structures that do not have a corresponding parent data structure. In exemplary embodiments, ParentID of the child data structure corresponds to the column in the child data structure, which maps to one entry in the parent data structure. In one embodiment, modified example query 5A depicts example query 4A after completion of step 212 of JOIN query modification program 200.

In step 214, JOIN query modification program 200 sends the query to external system 108. In one embodiment, JOIN query modification program 200 has modified example query 4A into modified example query 5A, which is in a format that external system 108 can process utilizing relationships between entities (i.e. parent entity 112 and child entity 114).

Figure 3:
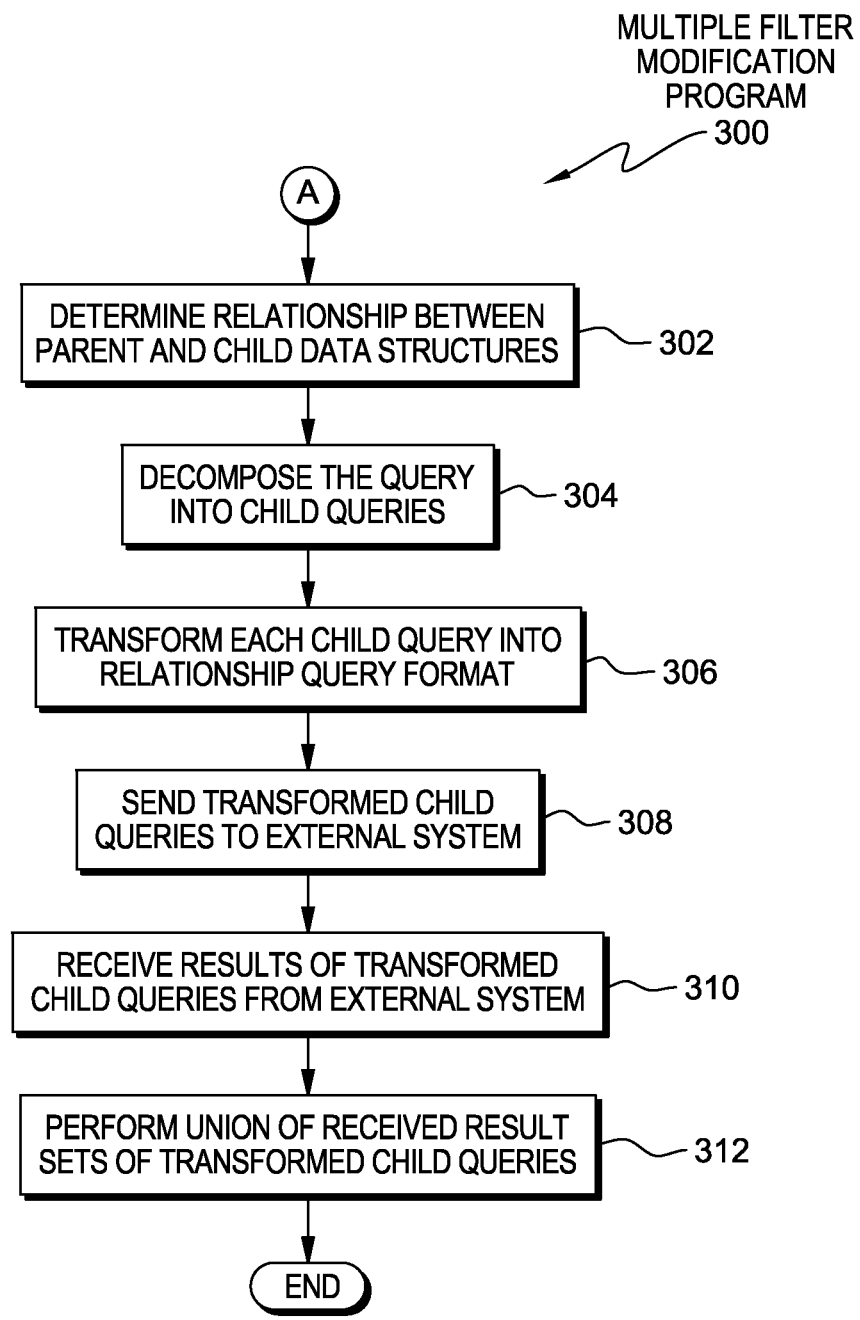
FIG. 3 is a flowchart depicting operational steps of a program for modifying a query containing a filter applied on multiple data structures in JOIN with an OR condition between filters, in accordance with an exemplary embodiment of the present invention.

FIG. 3 is a flowchart depicting operational steps of multiple filter modification program 300 in accordance with an exemplary embodiment of the present invention. In one embodiment, multiple filter modification program 300 initiates when JOIN modification program 200 determines that a query (i.e. example query 5B) has a filter applied on multiple data structures in JOIN with an OR condition between filters (in decision step 208).

In step 302, multiple filter modification program 300 determines the relationship between the parent and child data structures. The determination of the relationship between the parent and the child data structures is discussed in greater detail with regard to step 210 of JOIN query modification program 200.

In step 304, multiple filter modification program 300 decomposes the query into child queries. In one embodiment, multiple filter modification program 300 decomposes a single query (i.e. example query 4B), into "n" (n=number of data structures in query) child queries. With regard to example query 4B, multiple filter modification program 300 decomposes the single query into two child queries. In the example of example query 4B, multiple filter modification program 300 decomposes example query 4B into two child queries, each child query containing the JOIN condition from example query 4B, and containing filters on a single data structure from example query 4B (the parent query). In this example, multiple filter modification program 300 decomposes example query 4B into child query 6A, and child query 6B, as depicted in FIG. 6. In an exemplary embodiment, once multiple filter modification program 300 decomposes example query 4B, child query 6A and child query 6B correspond to example query 4B through a UNION. A UNION allows a combination of result sets of child query 6A and child query 6B to achieve the complete result set for example query 4B (discussed in greater detail with regard to step 312). FIG. 6 depicts example query 4B decomposed into child query 6A and child query 6B, and associating together through a UNION.

In step 306, multiple filter modification program 300 transforms each child query into relationship query format. In an example, multiple filter modification program 300 transforms child query 6A and child query 6B into relationship query format. Transformation of a query into relationship query format is discussed in greater detail with regard to step 212 of JOIN query modification program 200. In one embodiment, multiple filter modification program 300 transforms each child query corresponding to a query through UNION into relationship query format. In an example with regard to example query 4B (depicted in FIG. 6), multiple filter modification program 300 transforms child query 6A and child query 6B into relationship query format.

In step 308, multiple filter modification program 300 sends transformed child queries to external system 108. In one embodiment, multiple filter modification program 300 sends each individual child query that has been transformed in step 306 to external system 108 for processing.

In step 310, multiple filter modification program 300 receives results of transformed child queries from external system 108.

In step 312, multiple filter modification program 300 performs UNION of received result sets for transformed child queries. In one embodiment, multiple filter modification program 300 performs UNION of result sets received in step 310. In an example with regard to example query 4B, multiple filter modification program 300 performs UNION of the result sets for relationship queries (from step 306) corresponding to child query 6A, and child query 6B. In one embodiment, the result of step 312 is the same result set that example query 4B would return from external system 108.

FIGS. 4A and B are depictions of exemplary queries in accordance with various embodiments of the present invention as described herein above.

FIG. 5 is a depiction of a modified example query by JOIN query modification program 200 in accordance with various embodiments of the present invention as described herein above.

FIG. 6 is a depiction of an exemplary query decomposed into child queries by multiple filter modification program 300 in accordance with various embodiments of the present invention as described herein above.

Figure 7:
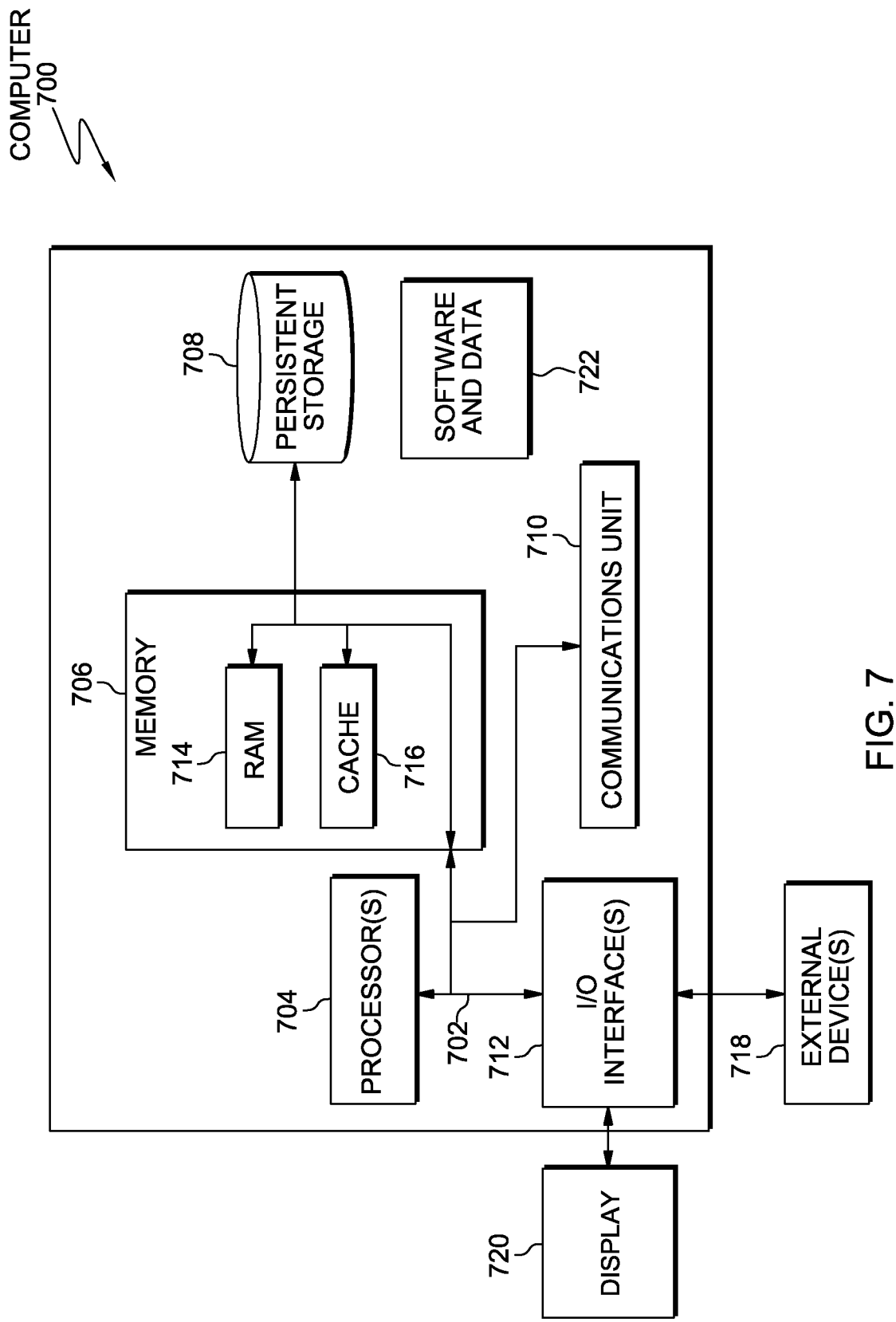
FIG. 7 depicts a block diagram of components of the computing system of FIG. 1 in accordance with an embodiment of the present invention.

FIG. 7 depicts a block diagram of components computer 700, which is representative of server 102, and external system 108, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computer 700 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media. Software and Data 722 stored in persistent storage 708 for access and/or execution by processor(s) 704 via one or more memories of memory 706. With respect to query optimization engine 106, software and data 722 includes JOIN query modification program 200 and multiple filter modification program 300.

In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Software and Data 722 may be downloaded to persistent storage 708 through communications unit 710.

I/O interface(s) 712 allows for input and output of data with other devices that may be connected to computer 700. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data 722 can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor. Display 720 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for modifying a query that includes a JOIN clause, the computer program product comprising:
   one or more computer-readable storage media and program instructions stored on the one or more computer-readable storage media, the program instructions comprising:
   program instructions to determine whether one or more data structures in a JOIN clause of a query include a parent/child relationship;
   program instructions responsive to determining that the one or more data structures in the JOIN clause of the query include a parent/child relationship, to determine whether the query that includes the JOIN clause includes a filter applied on one or more data structures in the JOIN clause with an OR condition between filters; and
   program instructions responsive to determining that the query that includes the JOIN clause does not include the filter applied on one or more data structures in the JOIN clause with an OR condition between filters, to modify the query that includes the JOIN clause to utilize relationship constructs corresponding to the determined parent/child relationship between the one or more data structures in the JOIN clause of the query.

2. The computer program product of claim 1, further comprising program instructions to:
   send the modified query to a system utilizing data relationship concepts.

3. The computer program product of claim 1, wherein the program instructions to determine whether the one or more data structures in JOIN clause of the query include a parent/child relationship, comprise program instructions to:
   access metadata corresponding to the data structures in the JOIN clause of the query; and
   determine a parent data structure and a child data structure of the data structures in the JOIN clause of the query.

4. The computer program product of claim 1, further comprising program instructions to:
   determine that the query that includes the JOIN clause does include a filter applied on one or more data structures in the JOIN clause with an OR condition between filters;
   determine one or more child queries from the query that includes the JOIN clause; and
   modify each of the one or more child queries utilizing relationship constructs.

5. The computer program product of claim 4, further comprising program instructions to:
   send the one or more modified child queries to a system utilizing data relationship concepts;
   receive a result set corresponding to each of the one or more modified child queries from the system utilizing data relationship concepts; and
   perform a UNION of received result sets corresponding to each of the one or more modified child queries.

6. The computer program product of claim 1, wherein said program instruction to modify the query that includes the JOIN clause into a query utilizing relationship constructs, comprise program instruction to:
   modify a SELECT clause of the query that includes the JOIN clause to utilize a child data structure to refer to a parent data structure;
   modify a FROM clause of the query that includes the JOIN clause to a name of the child data structure; and
   add a filter corresponding to the parent reference of the child data structure.

7. The computer program product of claim 4, wherein said program instructions to determine the one or more child queries from the query that includes the JOIN clause includes program instructions to:
   determine data structures and filters specified in OR condition of the query; and
   generate a child query, for each data structure specified in OR condition of the query, wherein each generated child query includes one or more clauses of the query that includes the JOIN clause with a WHERE clause comprising filters corresponding to one data structure.

8. The computer program product of claim 4, wherein said program instruction to modify each child query into a child query utilizing relationship constructs includes:
   modify a SELECT clause of the child query to utilize a child data structure to refer to a parent data structure;

modify a FROM clause of the child query to a name of the child data structure; and add a filter corresponding to a parent reference of the child data structure.

9. The computer program product of claim 1, wherein said program instructions to determine whether one or more data structures in a JOIN clause of a query include a parent/child relationship, comprise program instructions to:

program instructions to receive a query that includes a JOIN clause that references at least two data structures; and program instructions to determine whether the at least two data structures referenced by the JOIN clause included in the received query include a parent/child relationship.

10. The computer program product of claim 1, wherein the query is modified into a query utilizing relationship constructs prior to execution of the query or sending the query to a system for execution.

11. A computer system for modifying a query that includes a JOIN clause, the computer system comprising:

one or more computer processors;

one or more computer-readable storage media;

program instructions stored on the computer-readable storage media for execution by at least one of the one or more processors, the program instructions comprising:

program instructions to determine whether one or more data structures in a JOIN clause of a query include a parent/child relationship, wherein the one or more data structures can be one or more data tables;

program instructions responsive to determining that the one or more data structures in the JOIN clause of the query include a parent/child relationship, to determine whether the query that includes the JOIN clause includes a filter applied on one or more data structures in the JOIN clause with an OR condition between filters; and program instructions responsive to determining that the query that includes the JOIN clause does not include the filter applied on one or more data structures in the JOIN clause to utilize relationship constructs corresponding to the determined parent/child relationship between the one or more data structures in the JOIN clause of the query.

12. The computer system of claim 11, further comprising program instructions to:

send the modified query to a system utilizing data relationship concepts.

13. The computer system of claim 11, wherein the program instructions to determine whether the one or more data structures in the JOIN clause of the query include a parent/child relationship, comprise program instructions to:

access metadata corresponding to the data structures in the JOIN clause of the query; and determine a parent data structure and a child data structure of the data structures in the JOIN clause of the query.

14. The computer system of claim 11, further comprising program instructions to:

determine that the query that includes the JOIN clause does include a filter applied on one or more data structures in the JOIN clause with an OR condition between filters;

determine one or more child queries from the query that includes the JOIN clause; and modify each of the one or more child queries into a child query utilizing relationship constructs.

15. The computer system of claim 14, further comprising program instructions to:

send the one of more modified child queries to a system utilizing data relationship concepts;

receive a result set corresponding to each of the one or more modified child queries from the system utilizing data relationship concepts; and perform a UNION of received result sets corresponding to each of the one or more modified child queries.

16. The computer system of claim 11, wherein said program instruction to modify the query that includes the JOIN clause into a query utilizing relationship constructs, comprise program instruction to:

modify a SELECT clause of the query that includes the JOIN clause to utilize a child data structure to refer to a parent data structure;

modify a FROM clause of the query that includes the JOIN clause to a name of the child data structure; and add a filter corresponding to the parent reference of the child data structure.

17. The computer system of claim 14, wherein said program instructions to determine one or more child queries from the query that includes the JOIN clause, includes program instructions to:

determine data structures and filters specified in OR condition of the query; and generate a child query, for each data structure specified in OR condition of the query, wherein each generated child query includes one or more clauses of the query that includes the JOIN clause with a WHERE clause comprising filters corresponding to one data structure.

18. The computer system of claim 14, wherein said program instruction to modify each child query into a child query utilizing relationship constructs, includes program instructions to:

modify a SELECT clause of the child query to utilize a child data structure to refer to a parent data structure;

modify a FROM clause of the child query to a name of the child data structure; and add a filter corresponding to a parent reference of the child data structure.

19. The computer system of claim 11, wherein said program instructions to determine whether one or more data structures in a JOIN clause of a query include a parent/child relationship, comprise program instructions to:

program instructions to receive a query that includes a JOIN clause that references at least two data structures; and program instructions to determine whether the at least two data structures referenced by the JOIN clause included in the received query include a parent/child relationship.

20. The computer system of claim 11, wherein the query is modified into a query utilizing relationship constructs prior to execution of the query or sending the query to a system for execution.

* * * * *